March 11, 1941. A. W. VANCE Re. 21,749

REGULATING DEVICE

Original Filed Oct. 31, 1933 2 Sheets-Sheet 1

INVENTOR
Arthur W. Vance
BY T. R. Goldsborough
HIS ATTORNEY

March 11, 1941. A. W. VANCE Re. 21,749

REGULATING DEVICE

Original Filed Oct. 31, 1933 2 Sheets-Sheet 2

INVENTOR
Arthur W. Vance
BY T. R. Goldsborough
HIS ATTORNEY

Reissued Mar. 11, 1941

Re. 21,749

UNITED STATES PATENT OFFICE 21,749

REGULATING DEVICE

Arthur W. Vance, Haddonfield, N. J., assignor to Radio Corporation of America, a corporation of Delaware Original No. 2,075,966, dated April 6, 1937, Serial No. 696,001, October 31, 1933. Application for reissue December 22, 1938, Serial No. 247,305

24 Claims. (171—229)

My invention relates to regulating devices and particularly to low impedance voltage regulating and current regulating circuits which utilize electric discharge tubes for maintaining either a constant voltage or a constant current output.

There are many applications for a high voltage source which has a low impedance and a more constant voltage output than can be obtained from a rectifier and filter system. As an example, television amplifiers cannot be supplied with voltage from a filter system with satisfactory results.

Previously, in cases where the voltage requirements have been so strict, it has been necessary to employ batteries made up of a large number of cells. Such batteries are expensive and must be replaced periodically.

There are also many applications for a low impedance source which supplies a constant current regardless of adverse conditions such as varying load impedance or varying line voltage.

It is, accordingly, an object of my invention to provide a regulating circuit which will hold the voltage across a load constant when the voltage is supplied from a source of varying voltage such as a source of rectified current.

A further object of my invention is to provide an improved current regulating circuit which will supply a constant current to a load.

A still further object of my invention is to provide voltage and current regulating circuits of the above-mentioned types which do not have any batteries therein.

In practicing certain embodiments of my invention, I connect a power tube in series with the load, and vary the impedance of the power tube in accordance with voltage changes by connecting the control grid of the power tube to the output circuit of a direct current amplifier, the input circuit of the direct current amplifier being connected to a resistor shunted across the load. In certain specific embodiments, all batteries, such as grid biasing batteries, are eliminated by utilizing a glow tube in one of two voltage-opposing circuits.

In practicing other embodiments of my invention, a power tube is connected in shunt to the load instead of in series therewith. Also, in certain embodiments, a resistor is connected in series with the load, instead of in shunt to it, for applying a regulating voltage to the grid of the power tube.

Other features and advantages of my invention will appear from the following description taken in connection with the accompanying drawings, in which Figure 1 is a circuit diagram of a voltage regulating system constructed in accordance with one embodiment of my invention;

Figure 1:
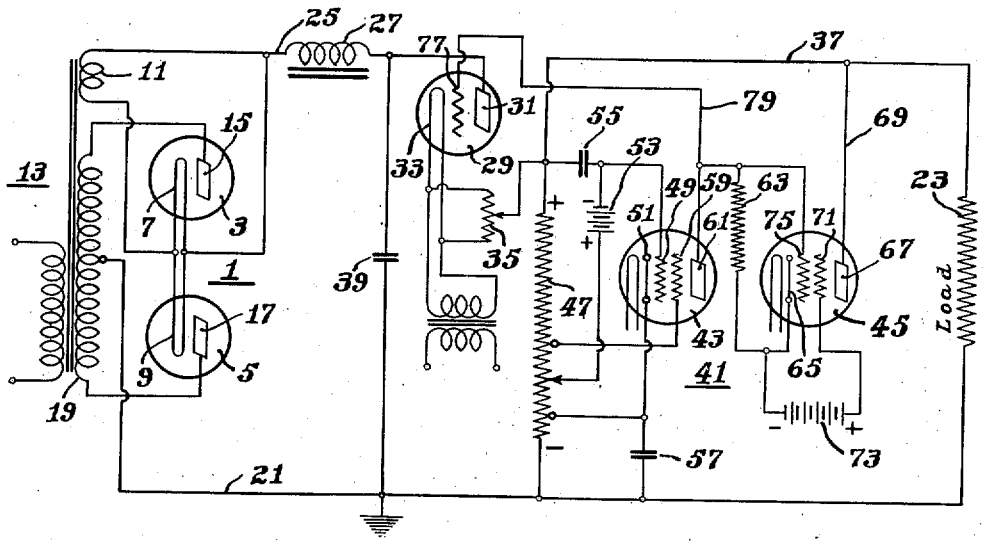

Referring to Fig. 1, a load is supplied with direct current from a full wave rectifier of conventional design. The rectifier 1 comprises rectifier tubes 3 and 5 having hot cathodes 7 and 9, respectively, which are supplied with current from the filament secondary winding 11 of a supply transformer 13. The anodes 15 and 17 of the rectifier tubes 3 and 5, respectively, are connected to the ends of the high potential winding 19 of the transformer 13.

A conductor 21 leading from the mid-point of the secondary winding 19, which forms one output lead or terminal of the rectifier 1, is grounded and connected to the bottom terminal of the load 23.

The other output lead or terminal 25 of the rectifier 1 is connected to the upper terminal of the load 23 through a filter choke 27 and a power tube 29. This connection may be traced from the rectifier 1 through the choke coil 27 to the plate 31 of the power tube 29, through the space-current path in the tube to the filament 33 and through the filament shunting resistor 35 and the conductor 37 to the upper terminal of the load 23.

The usual filter condenser 39 is connected between the load end of the choke coil 27 and ground.

It will be apparent that the voltage supplied to the load 23 would have a fairly large hum component if only the choke coil 27 and condenser 39 were relied on to filter the rectifier output. Therefore, in accordance with my invention, I provide a direct current amplifier 41 so connected in the circuit that the plate impedance of the power tube 29 is varied in the proper manner to maintain the voltage across the load constant.

The direct current amplifier 41 comprises an electric discharge device 43 which, preferably, is a screen grid vacuum tube, and another electric discharge device 45 which functions as a plate impedance for the first mentioned device 43. In accordance with a specific feature of my invention, the control voltage to the input circuit of the direct current amplifier 41 is supplied from a resistor 47 connected in shunt to the load 23.

Obviously, in order to obtain maximum control, the grid 49 and cathode 51 of the vacuum tube 43 should be connected across the entire resistor 47 to apply the total voltage drop of the resistor 47 to the amplifier input circuit. Such a connection, however, would require a very large biasing battery in a system where there is a voltage drop of several hundred volts across the load. Furthermore, a direct current connection across the entire resistor 47 is not necessary in order to obtain the necessary control for variations in the voltage.

I obtain the proper control for the above-mentioned voltage variations and a certain amount of control for the higher frequency or hum variations by conductively connecting the grid 49 and the cathode 51 across a small section of the resistor 47, thus allowing the utilization of a comparatively small biasing battery 53 in the grid circuit.

The desired additional regulating action for eliminating hum or comparatively high frequency voltage variations is obtained by connecting the control grid 49 and the cathode 51 across the entire resistor 47 by means of coupling condensers 55 and 57, respectively.

The screen grid 59 of the vacuum tube 43 is supplied with the proper positive potential by connecting it to a point on the resistor 47.

The plate 61 of the vacuum tube 43 is connected through the vacuum tube 45, which serves as a coupling resistor to the upper or positive terminal of the resistor 47. This circuit may be traced from the plate 61 of the amplifier tube 43 through a resistor 63 to the cathode 65 of the coupling tube 45, through the space charge path of the tube to the anode 67, and through the conductors 69 and 37 to the positive terminal of the resistor 47.

The screen grid 71 of tube 45 is supplied with a suitable positive potential by means of a battery 73.

The control grid 75 of coupling tube 45 is connected to the upper terminal of the resistor 63 so that the plate impedance of the coupling tube changes with a change in current through the resistor 63. It will be seen that the current flow through the resistor 63 is in such a direction that if the current flow increases, the grid 75 is made more negative and the plate impedance of the coupling tube 45 increases.

The plate impedance of the power tube 29 is controlled in accordance with the output of the direct current amplifier 41 by means of the power tube control grid 77 which is connected by means of a conductor 79 to the plate 61 of the amplifier tube 43.

The above described circuit provides what may be referred to as negative regeneration, since the direct current amplifier 41 is connected to resist variations in voltage rather than to amplify them. This action will be understood by considering the action of the amplifier 41 when the voltage output of the rectifier 1 increases. Such an increase will cause an increase in current flow through the shunting resistor 47 and make the control grid 49 of the amplifier tube 43 more positive with respect to the cathode 51. This causes an increase in current through the resistor 63 and coupling tube 45, whereby the plate 61 becomes less positive.

Since the control grid 77 of the power tube 29 is connected to the plate 61, it also becomes less positive, that is, more negative, and the impedance of the power tube 29 is increased, whereby any increase in voltage drop across the shunting resistor 47 is opposed. It will be understood that the voltage variation across the load 23 which is permitted by the system is a function of the gain of the direct current amplifier 41, the voltage variation being decreased by increasing the gain of the amplifier.

If desired, the coupling tube 45 may be replaced by an ordinary coupling impedance, but the gain of the amplifier 41 is increased by employing the coupling tube 45 since the coupling tube impedance increases with an increase in the plate current of tube 43. Also, a screen grid tube with a high negative bias on the grid and a low positive voltage on the plate, as in the case of tube 45, has a very high plate impedance, of the order of several megohms, yet the direct current drop across the tube is only a few volts with a plate current of one or two milliamperes. A resistor of similar impedance would have a very high voltage drop at the same current and it would be difficult and expensive to supply the necessary high voltage.

Although in the circuit shown in Fig. 1 there is very little drain on the batteries, obviously, the elimination of all batteries is desirable.

Figure 2:
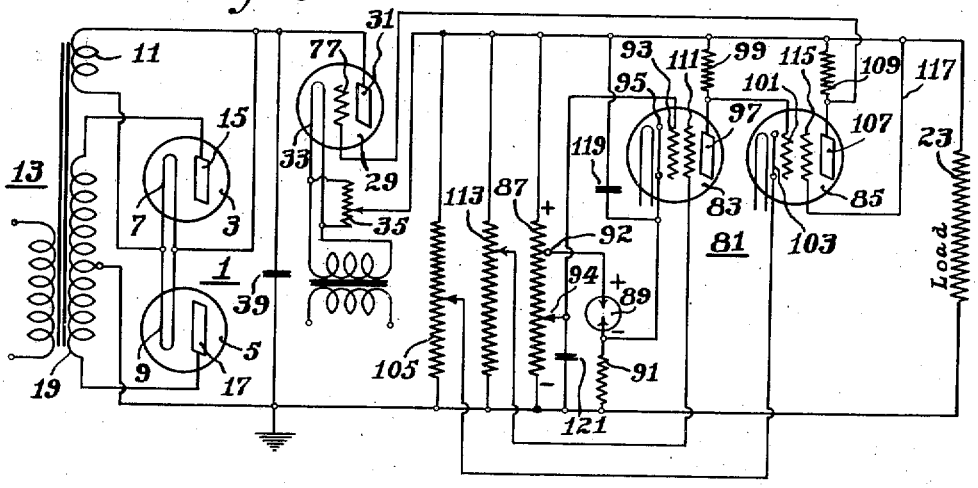
Fig. 2 is a circuit diagram of the voltage regulator which, in accordance with my invention, does not require the use of batteries.

Fig. 2 shows a system in which batteries have been eliminated by utilizing a special glow tube circuit. In Figs. 1 and 2 like parts are indicated by like reference numerals. It will be noted that in Fig. 2 the choke coil 27 of the filter has been omitted, this being feasible when the direct current amplifier of the regulator system has a high gain.

In Fig. 2 the direct current amplifier 81 comprises two screen grid tubes 83 and 85. As in Fig. 1, the control voltage for the direct current amplifier 81 is provided by means of a resistor 87 connected in shunt to the load 23.

A portion of the resistor 87 is shunted by a glow tube 89 connected in series with a current limiting resistor 91. The glow tube may be any one of the well known types such as a neon lamp. The control grid 93 of the amplifier tube 83 is connected to a point on that portion of the resistor 87 which is shunted by the glow tube 89, while the cathode 95 is connected to a point between the glow tube 89 and the current limiting resistor 91.

The glow tube 89 will have a substantially constant voltage drop thereacross so that it supplies a substantially constant biasing voltage in the grid circuit. It will be noted that since the resistor 87 and the glow tube 89 are connected in parallel with respect to the rectifier, their voltage drops are in opposition in the grid circuit of the amplifier tube 83.

In one embodiment of my invention, where the voltage drop across the load 23 was 230 volts, the glow tube 89 had a constant voltage drop of 110 volts thereacross, while the portion of the resistor between the points 92 and 94 had a normal voltage drop of 113 volts thereacross. This supplied the control grid 93 with a negative bias of 3 volts.

The plate 97 of the amplifier tube 83 is connected to the positive terminals of the voltage supply and load through a high resistance unit 99. The plate 97 is conductively coupled to the control grid 101 of the tube 85. In order to maintain the control grid 101 negative with respect to the cathode 103 of tube 85, the cathode 103 is connected to a point on a resistor 105 connected in shunt to the load, which point is positive with respect to the plate 97 and grid 101.

The plate 107 of the tube 85 is connected to the positive terminals of the voltage supply and load through a resistor 109 which may be of the same value as the resistor 99 in the plate circuit of the other tube. In one embodiment of the invention, resistors 99 and 109 had a value of 1 megohm.

Obviously, the plate 107 of tube 85 must be at a higher potential than the plate 97 of tube 83 in order that it shall be at a positive value with respect to its cathode 103. It is maintained at this higher potential since the plate current of the tube 85 is less than the plate current of the tube 83 due to the control grid 101 of tube 85 always being maintained more negative than the control grid 93 of tube 83.

The screen grid 111 of tube 83 is supplied with a suitable positive potential by means of a resistor 113 connected in shunt to the load 23, while the screen grid 115 of the tube 85 is supplied with the proper potential by connecting it to the positive terminal of the power supply through a conductor 117.

As in Fig. 1, the input circuit of the direct current amplifier 81 has an alternating current connection across the entire resistor 87, this connection being through coupling condensers 119 and 121. A strong control voltage will be applied to the amplifier input circuit through the coupling condensers for reducing voltage variations of a comparatively high frequency such as those having a frequency of 60 or 120 cycles.

Figure 3:
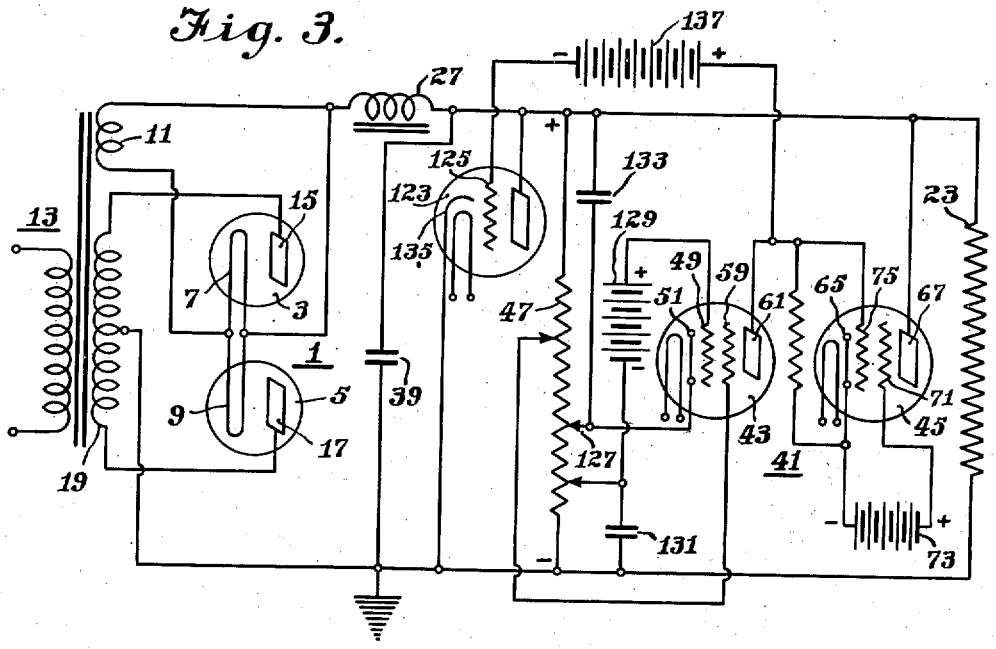
Fig. 3 is a circuit diagram of a voltage regulator constructed in accordance with another embodiment of my invention.

In Fig. 3, the circuit of Fig. 1 is shown modified for utilizing a voltage control tube connected in shunt to the load instead of in series with it. In the two figures like parts are indicated by like reference numerals.

Referring to Fig. 3, the power tube is shown replaced by a smaller three element tube 123 connected in shunt to the load. It will be seen that the tube 123 acts as a bleeder resistor, the impedance of which may be varied by means of a control electrode 125.

With the valtage control tube 123 in shunt to the load, the phase of the control voltage applied to the control grid 125 must be such that an increase in voltage drop across the resistor 47 causes a decrease in the plate impedance of the tube 123.

In order to get the proper phase relation, the control grid 49 of the amplifier tube 43 is connected below the point 127 on the resistor 47 to which the cathode 51 is connected. Since this connection would put the control grid 49 at a high negative potential, a biasing battery 129 is inserted in the grid circuit for maintaining the grid 49 at the proper negative bias. The grid 49 and cathode 51 are coupled across the entire resistor 47 by means of the coupling condensers 131 and 133, respectively, as in Fig. 1.

The impedance of the voltage control tube 123 is controlled in accordance with the output of the direct current amplifier 41 by means of the control grid 125 which is conductively coupled to the plate 61 of the amplifier tube 43. In order to maintain the control grid 125 at a negative potential with respect to the cathode 135, a biasing battery 137 is inserted in the connecting lead between the plate 61 and the control grid 125.

All of the above described circuits have the common features of a resistor connected in shunt to the load for supplying the control voltage to the direct current amplifier. They also have the common feature of a direct current amplifier which has its input circuit conductively connected across only a part of the voltage control resistor for opposing slow voltage changes and capacitively connected across the entire voltage control resistor for opposing voltage hum variations.

Figure 4:
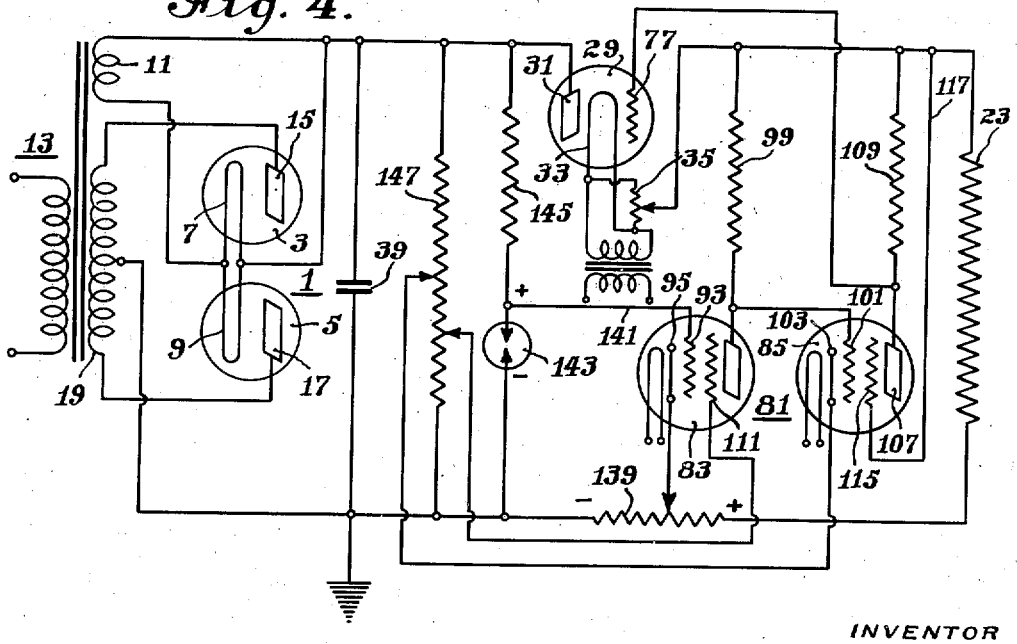
Fig. 4 is a circuit diagram of a current regulator constructed in accordance with one embodiment of my invention.

Referring to Fig. 4, where parts similar to those in Fig. 2 are indicated by like reference numerals, there is shown a current limiting system which does not require the use of batteries. As in Figs. 1 and 2, a power tube 29 is connected in series with the source of rectifying current and the load. In this circuit, however, the control voltage is supplied from a resistor 139 connected in series with the load.

The control voltage is applied to the input of a direct current amplifier 81 which is similar to the one shown in Figure 2.

The main distinction between the circuits of Figs. 2 and 4 resides in the input circuit of the direct current amplifier 81. The cathode 95 of the first amplifier tube 83 is connected to a point on the series resistor 139, while the control grid 93 of the amplifier tube 83 is connected through a conductor 141 to a circuit in shunt to the rectifier. This shunt circuit comprises a grid glow tube 143 connected in series with a current limiting resistor 145.

With respect to the grid circuit of the amplifier tube 83, the glow tube 143 is connected in series relation with the portion of the series resistor 139 which is in the said grid circuit. With respect to the rectifier, however, the glow tube 143 and the series control resistor 139 are connected in parallel. It will be apparent that the voltage drops across the glow tube 143 and the resistor 139 are in series opposition in the amplifier grid circuit so that the desired small negative bias is applied to the control grid 93.

It will be noted that the glow tube 143 and the resistor 147, which supplies the desired potential to the screen grid 111 and the cathode 103, are connected across the power supply at a point between the rectifier 1 and the power tube 29 instead of at a point between the load 23 and the power tube 29 as in the preceding figures. This is desirable since the voltage across the load may be varied greatly in maintaining the current through it substantially constant.

In both Fig. 2 and Fig. 4 the glow tube and current limiting resistor may be replaced by a ballast lamp connected in series with a resistor. Since a ballast lamp is a constant current device, the drop across the resistor will be substantially constant and may be utilized in place of the voltage drop across a glow tube. While it is preferred that a glow tube or some other device which has a substantially constant voltage drop thereacross be used, the operation of the circuit will be satisfactory so long as the voltage variation across the glow tube or substituted device is small compared with the voltage variation across the resistor. It will be noted that both the glow tube and the ballast lamp have an impedance which varies with the voltage impressed across them.

From the foregoing description, it will be apparent that I have provided regulating systems which are highly effective in supplying a load with either a constant voltage or a constant current and which are economical and convenient to operate. More particularly, I have provided certain vacuum tube regulating systems which derive all the voltages for the vacuum tubes from the source of power to be regulated whereby all batteries are eliminated. Also, I have provided certain other vacuum tube regulating systems which require only small biasing batteries which will have a long life.

Various modifications may be made in my invention without departing from the spirit and scope thereof, and I desire, therefore, that only such limitations shall be placed thereon as are necessitated by the prior art and set forth in the appended claims.

I claim as my invention:

1. In a voltage regulating system for a source of variable voltage, a load, a voltage divider resistor shunted across said load, an electric discharge tube having a control electrode, said tube being connected in the circuit between said source and said voltage divider resistor, and means for controlling the impedance of said tube in accordance with changes in voltage drop across said voltage divider resistor, said means comprising a direct current amplifier having an input circuit connected to said voltage divider resistor and an output circuit connected to said control electrode.

2. A system according to claim 1 characterized in that a second circuit including a glow tube is connected in shunt to a portion of said voltage divider resistor, said glow tube and said portion being connected in series relation in said input circuit of the direct current amplifier.

3. In a voltage regulating system for a source of variable voltage, a load, a voltage divider resistor shunted across said load, an electric discharge tube connected in series with said source and said load, said tube having a control electrode, and means for increasing the impedance of said tube in response to an increase in current through said voltage divider resistor, said means including a direct current amplifier having its input circuit connected across a low potential portion of said voltage divider resistor and its output circuit connected to said control grid.

4. In combination, an amplifier comprising an electric discharge device having input electrodes including a control electrode, a source of potential, a constant impedance device connected in series with said source, a gaseous discharge device also connected in series with said source, and means for connecting said impedance device and said gaseous discharge device in series relation between said input electrodes with the voltage drops in said devices in opposition.

5. Apparatus according to claim 4 characterized in that the gaseous discharge device is connected in a circuit which is in shunt to the constant impedance device.

6. Apparatus according to claim 4 characterized in that the gaseous discharge device is a glow tube.

7. In combination, an amplifier comprising an electric discharge device having input electrodes including a control electrode, a source of potential, a variable impedance circuit connected in series with said source of potential, a portion of said circuit having a constant voltage drop thereacross, an impedance device of comparatively constant impedance connected in a circuit in shunt to said variable impedance circuit, and means for connecting said impedance device and a portion of said variable impedance circuit in series relation between said input electrodes.

8. In combination, a source of electrical energy, a load connected thereto, an electric discharge tube connected in series with said load, a direct-current amplifier having input electrodes and an output circuit, a resistor connected across said load, a circuit including a glow tube connected across at least a portion of said resistor, one of said input electrodes being connected to the portion of said resistor shunted by said glow tube, and the other of said input electrodes being connected to said glow tube circuit, and means for so connecting the output circuit of said amplifier to said electric discharge tube that the impedance of said tube is increased in response to an increase in the voltage of said source.

9. In a voltage regulating system for a source of variable voltage, a load, an impedance device shunted across said load, an electric discharge tube connected in series with said source and said load, said tube having a control electrode, and means for increasing the impedance of said tube in response to an increase in current through said impedance device, said means including a direct current amplifier having input electrodes and an output circuit, a circuit including a glow tube connected across at least a portion of said impedance device, one of said input electrodes being connected to the portion of said impedance device shunted by said glow tube and the other of said input electrodes being connected to said glow tube circuit, said output circuit being connected to said control grid.

10. In a voltage regulating system including a source of variable voltage and a load connected thereacross, an impedance unit connected in shunt to said source, a variable impedance device connected in the circuit between said source and said impedance unit, and means including a direct current amplifier for controlling the impedance of said device in accordance with variations in voltage supplied from said source, said amplifier having input electrodes conductively connected across a portion of said impedance unit, said input electrodes also being coupled across a larger portion of said impedance unit by coupling means which will pass pulsating voltages only.

11. In a voltage regulating system including a source of variable voltage and a load connected thereacross, an impedance unit connected in shunt to said source, a variable impedance device connected in the circuit between said source and said impedance unit, means including a direct-current amplifier for controlling the impedance of said device in accordance with variations in voltage supplied from said source, said amplifier having input electrodes and an output circuit, means for conductively connecting said input electrodes across a portion of said impedance unit, means for capacitatively connecting said input electrodes across a larger portion of said impedance unit, and means for coupling the output circuit of said amplifier to said variable impedance device.

12. In a current regulating system, a source of current, a load connected thereto, an electric discharge tube connected in series with said load, a resistor also connected in series with said load, a glow-tube circuit connected across said source and in shunt relation to at least a portion of said resistor, and means for increasing the impedance of said tube in response to an increase in current through said resistor, said means including a direct current amplifier having an input circuit connected across said glow tube and said portion of said resistor, said glow tube and said resistor portion being in series relation with respect to said input circuit.

13. In combination, a source of voltage, an amplifier having an input circuit including input electrodes, a substantially constant impedance device connected across said source, a gaseous discharge device connected in parallel with said constant impedance device, means for connecting one of said input electrodes to said constant impedance device, and means for connecting the other of said input electrodes to said gaseous discharge device whereby said constant impedance device and said gaseous discharge device are connected in series in said input circuit.

14. In combination, an amplifier comprising an electric discharge tube having input electrodes including a control electrode, a source of potential, a first impedance device connected in series with said source, said first device having a substantially constant impedance, a second impedance device also connected in series with said source, said second device having an impedance which changes substantially instantaneously in response to a change in voltage impressed thereacross, and means for connecting said impedance devices in series relation between said input electrodes with the voltage drops in said devices in opposition.

15. A voltage regulating device including a source of current having a pair of terminals, a tube including electrodes and a grid, a conductive connection between one of said terminals and one of said electrodes, a connection leading from the other electrode, out-put means for the device connected at one side to the last mentioned connection, a connection leading from the remaining terminal of the source of current, control means for said grid bridged between the last two connections, and a conductive connection between said grid and the controlling means, said controlling means including a discharge gap and a resistor in series with the discharge gap and a contact movable over said resistor and forming a terminal for the last mentioned connection.

16. A regulating circuit for direct currents, said circuit having an input and an output tending to very from normal in accordance with the potential difference between the output and input, said circuit including a variable resistance tube, means for supplying a constant potential, and means to regulate the resistance of the tube in conformity with variations from normal of the potential difference between the first means and the output.

17. A voltage regulating device including a source of current having a pair of terminals, a tube including electrodes and a grid, a conductive connection between one of said terminals and one of said electrodes, a connection leading from the other electrode, out-put means for the device connected at one side to the last mentioned connection, a connection leading from the remaining terminal of the source of current, control means for said grid bridged between the last two connections, and a conductive connection between said grid and the controlling means, said controlling means including a discharge gap and a resistor in series with the discharge gap and a contact in series with said resistor and forming a terminal for the last mentioned connection.

18. The invention as set forth in claim 16, wherein said constant potential means includes a gaseous discharge device.

19. The invention as set forth in claim 16, wherein said constant potential means comprises a glow tube connected in series with a resistor.

20. The invention as set forth in claim 16, wherein said regulating means comprises a voltage divider network connected across said output circuit.

21. A voltage regulating device including a source of current having a pair of terminals, a tube including electrodes and a grid, a conductive connection between one of said terminals and one of said electrodes, a connection leading from the other electrode, output means for the device connected at one side to the last mentioned connection, a connection leading from the remaining terminal of the source of current, control means for said grid bridged between the last two connections, and a direct voltage responsive connection between said grid and the controlling means, said controlling means including a discharge gap and a resistor in series with the discharge gap and a contact movable over said resistor and forming a terminal for the last mentioned connection.

22. A voltage regulating device including a source of current having a pair of terminals, a tube including electrodes and a grid, a conductive connection between one of said terminals and one of said electrodes, a connection leading from the other electrode, output means for the device connected at one side to the last mentioned connection, a connection leading from the remaining terminal of the source of current, control means for said grid bridged between the last two connections, and a direct voltage responsive connection between said grid and the controlling means, said controlling means including a discharge gap and a resistor in series with the discharge gap and a contact in series with said resistor and forming a terminal for the last mentioned connection.

23. A voltage regulating device including a source of current having a pair of terminals, a tube including electrodes and a grid, a conductive connection between one of said terminals and one of said electrodes, a connection leading from the other electrode, output means for the device connected at one side to the last mentioned connection, a connection leading from the remaining terminal of the source of current, control means for said grid bridged between the last two connections, and a direct voltage responsive connection between said grid and the controlling means, said controlling means including a discharge gap and a resistor in circuit with the discharge gap and a contact movable over said resistor and forming a terminal for the last mentioned connection.

24. A voltage regulating device including a source of current having a pair of terminals, a tube including electrodes and a grid, a conductive connection between one of said terminals and one of said electrodes, a connection leading from the other electrode, output means for the device connected at one side to the last mentioned connection, a connection leading from the remaining terminal of the source of current, control means for said grid bridged between the last two connections, and a direct voltage responsive connection between said grid and the controlling means, said controlling means including a discharge gap and a resistor in circuit with the discharge gap and a contact in circuit with said resistor and forming a terminal for the last mentioned connection.

ARTHUR W. VANCE.